May 26, 1953 W. E. MEYER ET AL 2,639,933
BUMPER FOR TRACTORS AND THE LIKE
Filed March 9, 1949
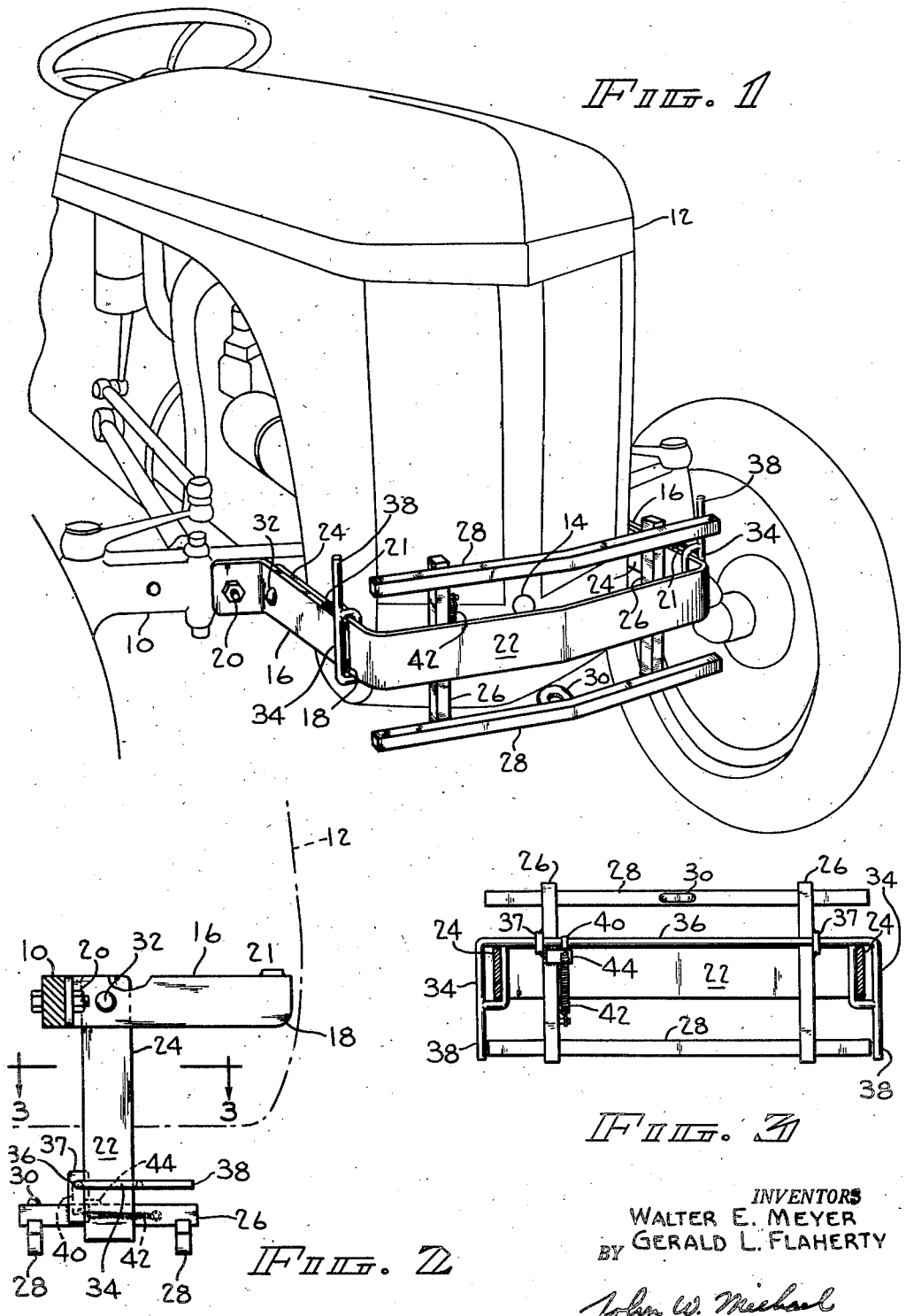
INVENTORS
WALTER E. MEYER
BY GERALD L. FLAHERTY
John W. Michael Patented May 26, 1953

2,639,933

UNITED STATES PATENT OFFICE 2,639,933

BUMPER FOR TRACTORS AND THE LIKE

Walter E. Meyer and Gerald L. Flaherty, Fond du Lac County, Wis., assignors to The Michler Company, Fond du Lac, Wis., a corporation of Wisconsin Application March 9, 1949, Serial No. 80,418

1 Claim. (Cl. 293—73)

This invention relates to improvements in bumpers for tractors and the like, and particularly to bumpers which are swingably mounted and movable from operative to inoperative position to make the front end of the tractor readily accessible.

Certain types of farm tractors do not have self-starters and must be hand-cranked from the front. In other types of tractors the engine hood must be swung forwardly when filling the gasoline tank and when seeking access to the engine. It is impractical to install a rigid front bumper on these types of tractors as it interferes with hand-cranking and opening of the engine hood.

It is the object of this invention, therefore, to provide a front bumper for a tractor which will be readily shiftable to an inoperative position to provide access to the hand crank or crank opening and permit the engine hood to be fully opened.

This object is obtained by pivotally securing the main frame of the bumper to mounting brackets carried by the front axle of the tractor and providing a self-engaging lock which in the locked position will rigidly hold the main frame in bumper operative position and which will be readily unlocked to let the main frame swing downwardly out of interference with the hand crank or crank opening for the engine and the forward end of the engine hood when such hood is swung to open position.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawing, in which:

Fig. 1 is a perspective view of a bumper embodying the present invention attached to the front axle of a tractor;

Fig. 2 is a view in side elevation of the bumper shown in Fig. 1 with the main frame thereof swung to inoperative position; and Fig. 3 is a sectional view taken on line 3—3 of Fig. 2.

Referring to the drawing by reference numerals, the bumper hereinafter described is shown mounted on the front axle 10 of a tractor. In farm tractors, and other tractors of like nature, the engine is protected by a hood 12 and the hand-crank is inserted through an opening 14 to engage with the crank shaft of the engine to start it. In some instances it is necessary to swing the hood about a forward pivot to have access to the gasoline tank of the tractor mounted above the engine. In order that ready access may be had to the crank opening 14; the hand-crank easily manipulated; and the hood pivoted to open position, the bumper is designed so that its main frame will readily swing down into an inoperative position out of the way as shown in Fig. 2. To accomplish this a pair of mounting brackets are bolted to the axle 10 by bolts and nuts, indicated generally at 20, which pass through openings in the axle 10. (If the standard openings for axle length adjustment are not available necessary openings may be made.) The brackets have forwardly extending arms 16 the forward lower corners of which are curved to provide cams 18 for the purpose hereinafter described. On the top arms 16 there is provided a stop 21 which acts to limit the upward movement of the main frame 22.

The main frame 22 is provided with supporting legs 24 pivotally mounted to the arms 16 by rivets 32. To increase the working surface of the bumper the main frame has a pair of vertical members 26 to which are secured cross bars 28. The lower cross bar 28 may have attached thereto an eye 30 for receiving a tongue bolt or the like when it is desired to connect the front end of the tractor to the tongue of a wagon for the purpose of backing the wagon. When the main frame is swung to the operative position, shown in Fig. 1, the arms 16 and the legs 24 are in overlapping parallel relationship. This provides lateral stability for the bumper and also forms an element of a self-locking mechanism for holding the bumper in operative position.

The self-locking mechanism also includes a pair of straps or eyes 34 mounted on a rod 36 pivotally carried in bearings 37 fixed to the rear of the vertical members 26. It is desirable to provide handles 38 by which the straps 34 may be operated. The straps 34 are continually swingably urged toward locking position (counter-clockwise as viewed in Fig. 2) by a spring 42 secured at one end to the vertical member 26 and at the other end to a lever 40 rigidly mounted on the bar 36. In order to prevent the straps 34 from swinging counter-clockwise beyond the position shown in Fig. 2, a stop 44 is secured to the bar 26 to engage the lever 40. The straps 34 encircle both the supporting legs 24 and the forward end of the extending arms 16 and thus lock these legs and arms in overlapping parallel relationship and hold the main frame 22 in the operative position shown in Fig. 1.

When it is desired to have access to the crank opening 14 to swing the hood 12 to open position, the main frame 22 is lowered to the inoperative position shown in Fig. 2. This is done by pulling forward against the tension in spring 42 either or both of the handles 38 to rotate the straps 34 in a clockwise direction (as viewed in Fig. 2) swinging such straps so that they no longer encircle the extending arms 16. The main frame 22 will then drop to the inoperative or lowered position shown in Fig. 2.

To again place the main frame 22 in the operative position, it is only necessary to grasp the upper cross bar 28 and swing the frame upwardly. As this is done the top leg of the straps 34 engages the cam 18 and the straps are swung clockwise (as shown in Fig. 2) so as to ride along the ends of arms 16 permitting the main frame 22 to continue its upward travel. When the supporting legs 24 are parallel with the extending arms 16 the straps 34 will snap counter-clockwise (as viewed in Fig. 2) under the influence of spring 42, and will again encircle both the legs 24 and the arms 16, thus automatically locking the main frame 22 in the operative position.

Although only one embodiment of the invention is shown and described herein, it will be understood that this application is intended to cover such changes or modifications as come within the spirit of the invention or scope of the following claim.

We claim:

In a bumper for a tractor having bumper mounting brackets provided with forward extensions, and a bumper having rearwardly extending legs adjacent said extensions and pivoted thereto inwardly of the forward ends of said extensions to pivotally support said bumper, said extensions and legs being substantially overlapped in the normal position of said bumper, a latch for holding said bumper in said normal position comprising a transverse rod pivoted to said legs with the axis of said rod adjacent the under side of said legs and slightly rearward of the forward ends of said extensions when said bumper is in normal position, a pair of eyes carried by said rod and encircling said legs, said eyes being long enough to permit them to be pivoted about the axis of said rod and swung at the top of said eyes enough to be moved forwardly of the forward ends of said extensions to permit disengagement therefrom, said eyes being wide enough to swing over the forward ends of said extensions and engage the forward edges of said extensions to lock said eyes thereto, a lever secured to said rod, spring means acting between said lever and said bumper to swing said eyes rearwardly into locked position with said extensions to hold said bumper in normal position, and a cam on the lower forward corner of at least one of said extensions to engage the top of an eye and swing said eyes forwardly as said bumper is moved toward normal position.

WALTER E. MEYER.
GERALD L. FLAHERTY.

References Cited in the file of this patent

UNITED STATES PATENTS

| Number | Name | Date |
|---|---|---|
| 1,159,393 | Kerfoot | Nov. 9, 1915 |
| 1,441,254 | Whittington | Jan. 9, 1923 |
| 1,513,991 | Homan et al. | Nov. 4, 1924 |
| 1,596,903 | Thwaits | Aug. 24, 1926 |
| 2,399,810 | Ketcham | May 7, 1946 |
| 2,415,968 | Price | Feb. 18, 1947 |
| 2,537,553 | Schonauer | Jan. 9, 1951 |